United States Patent [19]

Hanna

[11] E Re. 28,580

[45] Reissued Oct. 28, 1975

[54] WRAPAROUND BRUSHING DEVICE

[76] Inventor: Daniel C. Hanna, 1133 Rivington Drive, Portland, Oreg. 97227

[22] Filed: Nov. 1, 1974

[21] Appl. No.: 519,820

Related U.S. Patent Documents

Reissue of:

[64] Patent No.: 3,812,549
Issued: May 28, 1974
Appl. No.: 279,435
Filed: Aug. 10, 1972

[63] Continuation of Ser. No. 218,409, Jan. 17, 1972.

[52] U.S. Cl. ..... 15/21 D; 15/DIG. 2
[51] Int. Cl.[2] ..... B60S 3/06
[58] Field of Search ..... 15/DIG. 2, 21 D, 21 E, 15/53, 97

[56] References Cited

UNITED STATES PATENTS

| | | | |
|---|---|---|---|
| 3,570,034 | 3/1971 | Lanfrankie | 15/21 D |
| 3,601,833 | 8/1971 | Takeuchi | 15/21 E |

FOREIGN PATENTS OR APPLICATIONS

| | | | |
|---|---|---|---|
| 1,523,276 | 3/1968 | France | 15/DIG. 2 |
| 1,951,067 | 10/1970 | Germany | 15/DIG. 2 |
| 1,243,230 | 8/1971 | United Kingdom | 15/DIG. 2 |

*Primary Examiner*—Edward L. Roberts
*Attorney, Agent, or Firm*—Klarquist, Sparkman, Campbell, Leigh, Hall & Whinston

[57] ABSTRACT

A wraparound brushing device 20 (FIGS. 1–4) has a linkage carrying a brush and urged toward a normal position by a spring and a counterweight. A top brushing device 120 (FIGS. 5 and 6) includes a pair of linkages at each side which fold as the brush rolls over the top of a car and then unfold to cause the brush to follow the rear surfaces of the car. Wraparound brushing devices 220 (FIG. 7), 320 (FIG. 8), 420 (FIG. 9) and 520 (FIG. 10) are moved around moving cars solely by the action of rotating brushes and constantly operative biasing means.

11 Claims, 10 Drawing Figures

WRAPAROUND BRUSHING DEVICE

Matter enclosed in heavy brackets [ ] appears in the original patent but forms no part of this reissue specification; matter printed in italics indicates the additions made by reissue.

---

This is a continuation, of application Ser. No. 218,409 filed Jan. 17, 1972.

DESCRIPTION

This invention relates to improved wraparound brushing devices, and more particularly to improved automatic wraparound brushing devices.

An object of the invention is to provide improved wraparound brushing devices.

Another object of the invention is to provide improved automatic wraparound brushing devices.

A further object of the invention is to provide improved wraparound brush actuators.

Another object of the invention is to provide a wraparound brush device including a rotary brush which is held against a car and is driven at least half way around a car solely by reaction of the car on the brush and by a biasing mechanism including a counterweight and adjustable guide means to control the force of the counterweight exerted on the brush.

Another object of the invention is to provide an improved wraparound brushing device in which a fixed rotary brush mechanism cleans one side of a car and a movable rotary brush mechanism cleans the entire front end, the other side and the entire back end of the car.

A further object of the invention is to provide a wraparound brush device wherein a first, supporting arm normally is biased toward a position extending forwardly along the side of a path of a car and carries pivotally a second, brush carrying arm in a normal position extending across the path of the car with biasing means biasing the arms toward the normal positions thereof, with the rotation of the brush, constituting the sole driving force of the device.

Another object of the invention is to provide an improved wraparound brush device including an overhead monorail inclined across a path of a car and carrying a carriage which pivotally mounts an overhead arm carrying a rotary brush, with the arm normally biased toward a position extending forwardly along the path.

Another object of the invention is to provide an improved wraparound brush device including an overhead arm carrying a rotary brush and mounted pivotally by a carriage movable on a monorail extending transversely of the path with the arm biased toward a normal position extending transversely of the path and swingable forwardly to move off the front end of the car, the arm also being swingable rearwardly as the brush moves along the side of the car and then swingable forwardly to keep the brush against the rear end of the car.

Another object of the invention is to provide a wraparound brush device in which a rotary top brush is carried by a first pair of normally forwardly extending arms bracketing a path of a car and a second pair of normally downwardly extending arms bracketing the path of the car to pivotally mount the first pair of arms.

The invention provides improved wraparound brush devices in which counterweight biasing mechanisms bias arms to normal positions holding rotary brushes in the paths of cars and holding the brushes against the car with the brushes being rotated in directions such that reaction forces of the cars thereon move the brushes around the front end side and rear end of the car. In a device forming a specific embodiment of the invention, a first overhead arm pivotally mounted on an arch carries a brush carrying arm and a cable and a spring connect a counterweight to the second arm to bias the arms toward normal positions in which one of the arms extends transversely of the path of the car and the other arm extends along the path of the car, the cable traveling around a pulley which is adjustable to vary the force exerted on the arms. In a wraparound brush device forming an alternate embodiment of the invention, a rotary top brush is carried by a first pair of forwardly extending arms pivotally mounted on a second pair of downwardly extending arms mounted pivotally on an arch with both pairs of arms bracketing the path of a car to be cleaned. Another improved wraparound brush device forming an alternate embodiment of the invention includes a first rotary brush positioned for rotation on a fixed axis at one side of a path of a car guided by a track to brush the adjacent side of the car, and a second rotary brush is carried by a pivoted arm construction for travel sequentially across the front end of the car along the side of the car remote from the first brush and across the rear end of the car. Another wraparound brush device forming an alternate embodiment of the invention includes a first pivotal arm extending forwardly along the side of the path of a car and a brush carrying second arm pivotal on the first arm between a normal position extending transversely of the path and a second position folded back on the first arm with a single biasing mechanism crossing the first arm and urging the first arm toward the car and the second arm forwardly. In another wraparound brush device forming an alternate embodiment of the invention, an overhead carriage is slidable along a monorail forwardly and across the path of a car and pivotally mounts an overhead brush carrying arm. In another wraparound brush device forming an alternate embodiment of the invention, an overhead brush carrying arm pivoted on a carriage movable along a monorail transversely away from the path of a car is biased toward a normal position extending transversely of the path and may be swung forwardly and rearwardly.

A complete understanding of the invention may be obtained from the following detailed description of improved wraparound brush devices forming specific embodiments thereof, when read in conjunction with the appended drawings, in which.

Figure 1:
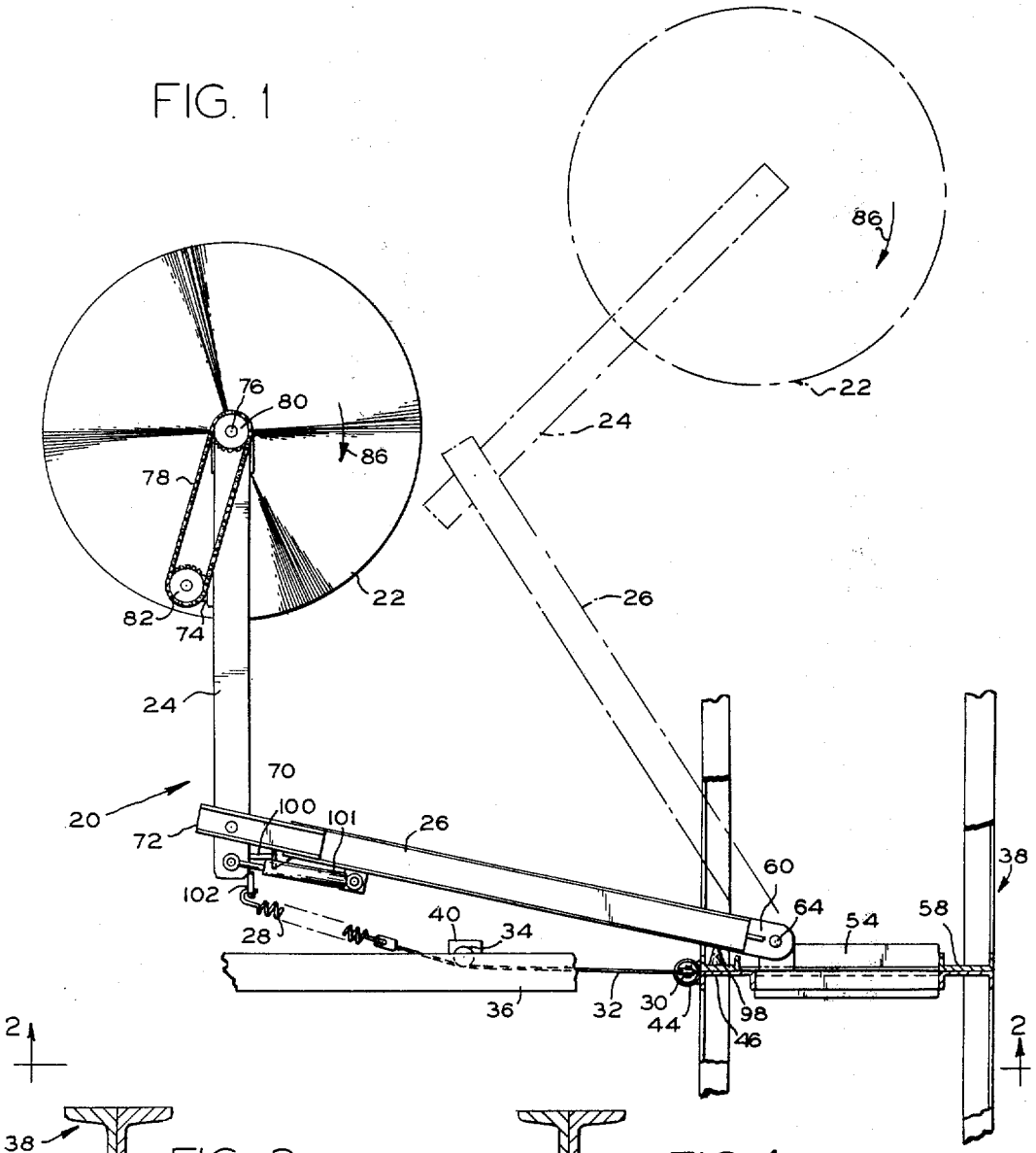
FIG. 1 is a top plan view of an improved wraparound [bruch] *brush* device forming one embodiment of the invention.
Figure 3:
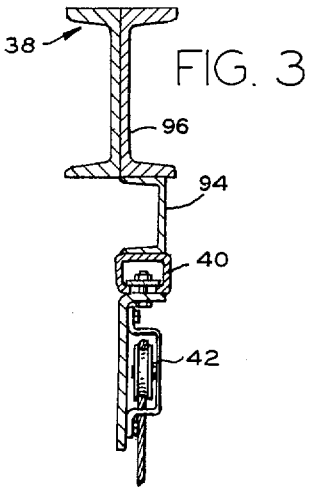
FIG. 3 is an enlarged vertical section taken along line 3—3 of FIG. 2.
Figure 4:
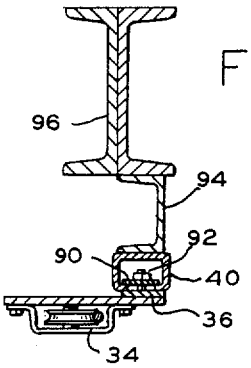
FIG. 4 is an enlarged vertical section taken along line 4—4 of FIG. 2.

Referring now in detail to the drawings, a wraparound brush device 20 includes a rotary brush 22 carried by an overhead brush carrying arm 24 pivotally mounted on an arm 26. A biasing mechanism includes a spring 28 connected to the arm 24, a counterweight 30 and a cable 32 connecting the counterweight 30 and traveling around a pulley 34 carried adjustably on an elongated channel member 36 of an arch or fixed frame 38 by a bracket 40. The bracket 40 is bolted to the frame member 36 and is adjustable along the frame member 36 to vary the angle from the pulley 34 to the point of attachment of the spring 28 to the arm 24. A second pulley 42 is mounted on the arch for rotation on a fixed axis and the cable extends vertically therefrom to the counterweight 30 which is slidable in a vertical tubular container 44 fixed rigidly to a post portion 46 of the arch in a poistion directly below the pulley 42. Vertically aligned bearings 50 and 52 are mounted on cross members 54 and 56 welded to the post portion 46 and a post portion 58 of the arch. Brackets 60 and 62 fixed to a vertical leg 66 of the arm 26 are mounted pivotally on pins 64 of the bearings to mount the arm 26 pivotally.

The arm 24 (FIGS. 1 and 2) is mounted pivotally on a vertical axis and on the free end of the arm 26 by a pin and bearing construction 70 and a clevis-like member 72. An electric or hydraulic motor 74 mounted on the arm 24 drives a vertical shaft 76 through a chain 78 and sprockets 80 and 82. The shaft is journaled in radial and thrust bearings in tubular member 84, and the brush 22 is mounted on and keyed to the lower end of the shaft. The motor rotates the brush in the direction of an arrow 86.

The pulley 34 (FIGS. 1 to 4) is carried by the bracket 40 which is clamped by plate 90 and bolts 92 to the channel-like member 36 in the desired position of adjustment. The member 36 is fixed to spacer member 94 fixed to overhead cross member 96 of the arch 38. The bolts 92 are secured to the bracket 40, and the nuts on the bolts may be loosened, the bracket 40, the spacer member 94 and the bolts be slid along the member 40 and the nuts retightened to adjust the position of the pulley 34 longitudinally relative to the arm 26. This adjustment changes the angle of the tension means 28, 32 relative to the arms 24 and 26, thus enabling optimum angular positioning of the tension means.

Figure 2:
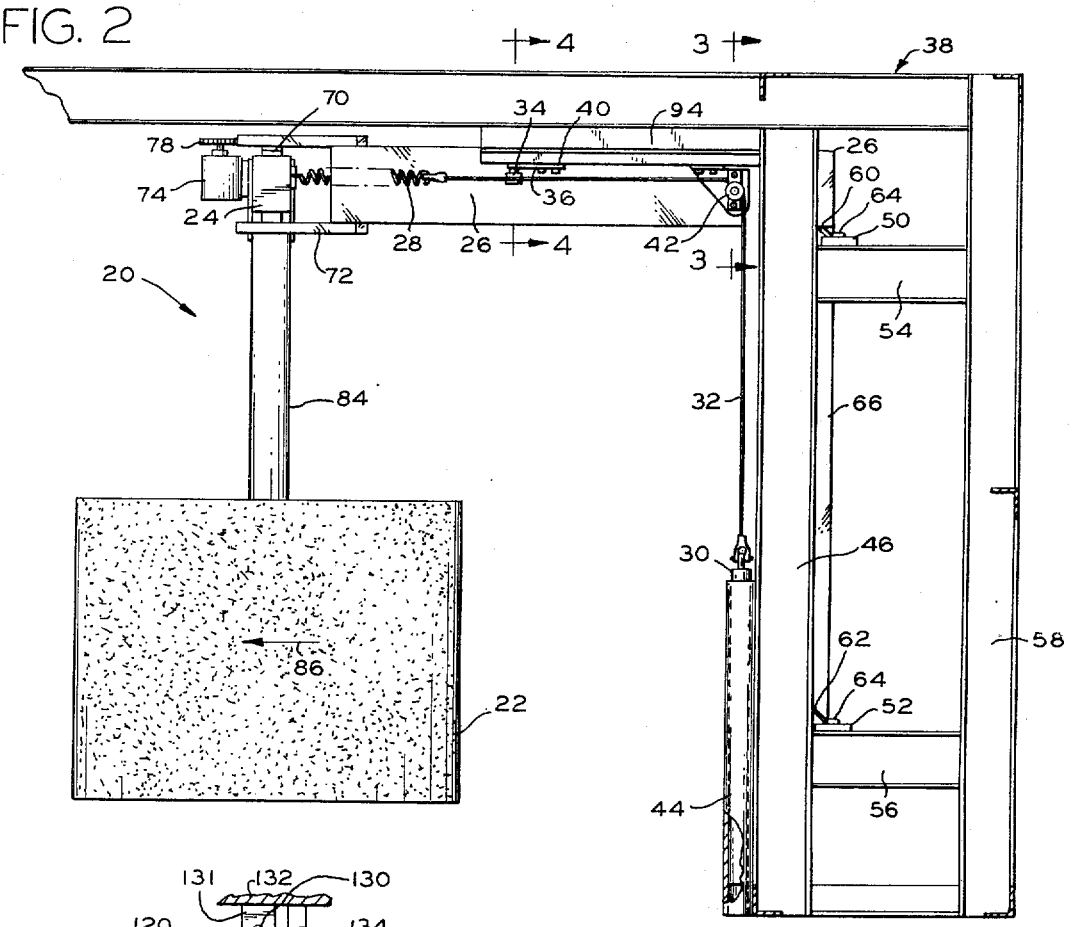
FIG. 2 is a front elevation view of the brush device of FIG. 1.

In the operation of the wraparound brush device 10, a car is driven upwardly as viewed in FIG. 1, and engages the rotating brush 22 and swings, against the action of the counterweight 30, the brush, the arm 24 and the arm 26 clockwise until the brush clears the right front corner of the car. The brush 22 then engages the right side of the car and drives itself rearwardly to fold or cock the arm 24 back along the arm 26 and the arm 26 is moved back to its normal position engaging a cushioned stop 98. Then when the right rear corner of the car clears the brush the arm 24 is swung forwardly and across the rear end of the car to its normal position engaging a cushioned stop 100 on the arm 26, the counterweight 30 continuously urging the arms 24 and 26 toward their normal positions and serving to hold the brush against the car throughout the passage of the car past the brush. The spring 28 takes away sudden shocks and is fastened to bracket 102 fixed to the arm 24. A shock absorber 101 exerts a slowing or damping effect on the folding movement of the arm 24.

EMBODIMENT OF FIGS. 5 AND 6

A brush device 120 forming an alternate embodiment of the invention includes a rotary brush 122 carried for rotation on a horizontal axis by arms 124 spaced farther apart than the width of a car 125 to be brushed and extending along the path of the car on opposite sides of the path of the car. The arms are normally in horizontal, forwardly extending positions engaging stops 127 of arms 126 to which the arms 124 are pivoted by pins 129. The arms 126 also bracket, with clearance, the path of the car 125 and are pivotally mounted on aligned horizontal pins 130 carried by brackets 131 fixed to an overhead cross member 132 of an arch or frame. Gravity urges the arms 124 and 126 toward their normal positions in which the arms 126 are vertical and engage stops 134 carried by the member 132 and the arms 124 are horizontal and engage the stops 127. An electric or hydraulic motor 136 rotates shaft 138 supporting and keyed to the brush 122 to rotate the brush 122 clockwise, as viewed in FIG. 5.

Figure 5:
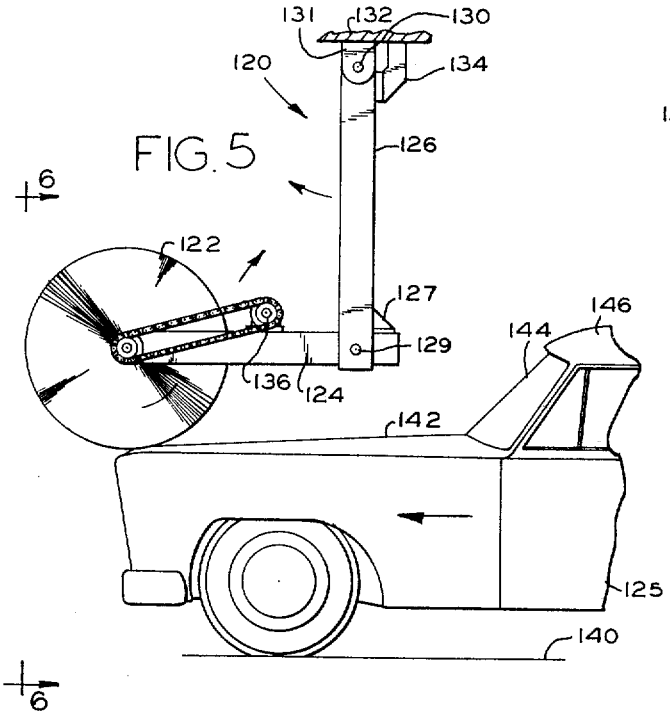
FIG. 5 is a side elevation view of an improved wraparound brush device forming an alternate embodiment of the invention.
Figure 6:
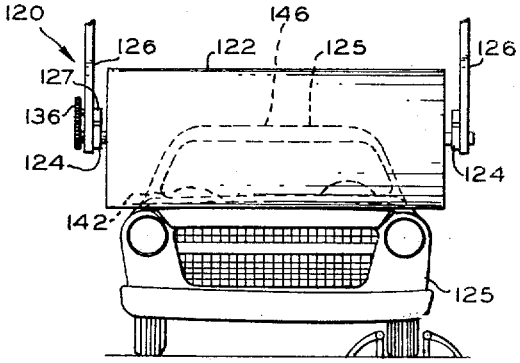
FIG. 6 is a front elevation view taken along line 6—6 of FIG. 5.
Figure 7:
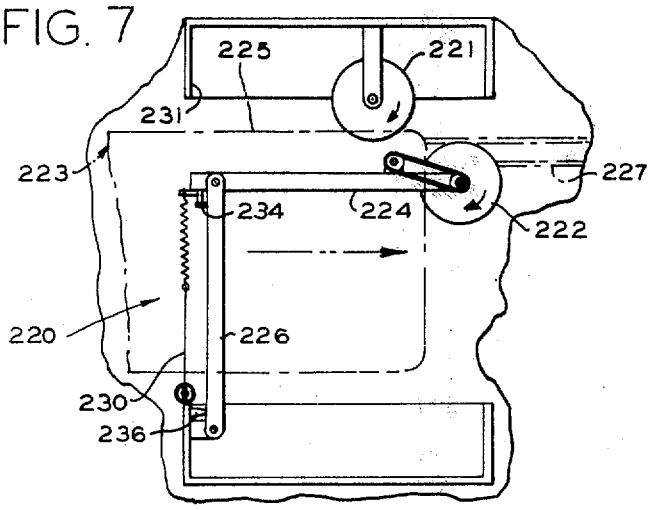
FIGS. 7, 8, 9 and 10 are top plan views of improved wraparound brush devices forming alternate embodiments of the invention.

As the car 125 is advanced continuously to the left, as viewed in FIG. 5, along its path 140 between the arms 124 and 126, a hood 142 of the car engages and is brushed by the brush 122. Then the windshield 144 of the car engages, is brushed by, and pushes the brush forwardly with the car, the brush and the arms 124 and 126 swinging clockwise as a unit until top 146 of the car is engaged by the brush. Then the reaction of the car from the brush rotation folds the arms 124 upwardly and back on the arms 126 and moves the arms 126 back to their normal positions. Then, as the rear window comes to the brush, the arms 124 swing the brush forwardly and downwardly to keep the brush in engagement with the rear window. The brush then engages the top of the trunk and brushes it.

EMBODIMENT OF FIG. 7

A wraparound brush device 220 forming an alternate embodiment of the invention is used with a rotary brush 221 rotated on a fixed vertical axis in an arch 231 and serving to brush lefthand side 225 of a car 223 as the car 223 moves continuously from left to right along a wheel guiding track 227. The device 220 is identical with the brush device 20 except that overhead arms 224 and 226 carrying rotated brush 222 are sufficiently longer than the arms 24 and 26 that the brush 222 normally is positioned in the path of the lefthand corner portion of the car 223 and brushes the entire front end and the entire rear end of the car as well as the righthand side of the car. A counterweighted biasing mechanism 230 normally holds the arm 224 against stops 234 and arm 226 against stop 236 in which positions the arm 224 extends forwardly along and over the lefthand portion of the car and the arm 228 extends directly across and over the path of the car.

In the operation of the device 220 and the brush 221, the car is driven along the path with its lefthand wheels in the track 227. The brush 221 brushes the lefthand side of the car. The left front corner of the car engages the brush 222 and swings the brush and the arms 224 and 226 as a unit clockwise until the brush clears the right front corner. The brush then engages the right-hand side of the car and folds the arm 224 back on the arm 226 and returns the latter to its normal position. Then, as the right rear corner of the car clears the brush, the brush is swung forwardly with the car and entirely across the rear end of the car to brush the entire rear end of the car.

EMBODIMENT OF FIG. 8

A wraparound brush device 320 forming an alternate embodiment of the invention is like the device 20 except that an overhead arm 324 carrying a rotary brush 322 is normally in a position extending transversely across the path of a car 323 and an arm 326 pivotally mounting the arm 324 normally is in a position extending forwardly along the side of the path of the car. A counterweighted biasing mechanism 328 crossing the arm 326 and secured to the arm 324 urges the arm 324 clockwise toward its normal position engaging a stop 331 and urges the arm 326 counterclockwise toward its normal position engaging a stop 333. The biasing mechanism includes a cable 330 guided by an adjustable pulley mechanism 332. A motor 338 continuously drives the brush 322 in a clcockwise direction, as viewed in FIG. 8.

Figure 8:
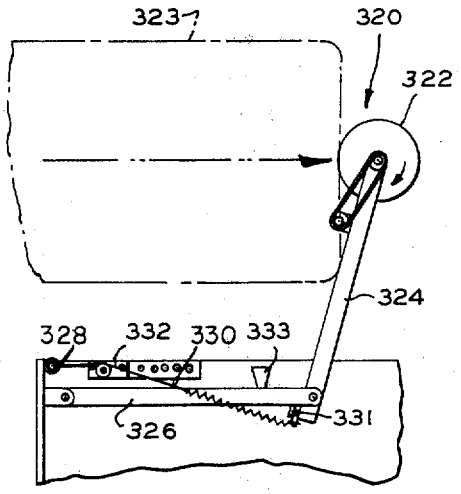

In the operation of the wraparound brush device of FIG. 8, the front end of the car 323 first engages the brush 322 and swings the brush 322 and the arms 324 and 326 as a unit clockwise until the brush clears the right front corner of the car. Then the brush, in effect, rolls itself rearwardly along the car to move the arm 324 to a rearwardly extending position folded on the arm 326 which is moved back to its normal position engaging the stop 333. Then when the right rear corner of the car clears the brush, the arm 324 swings the brush forwardly with and across the rear end of the car.

EMBODIMENT OF FIG. 9

A wraparound brush device 420 includes a brush 422 driven in a clockwise direction by motor 425. The brush and motor are carried by an overhead arm 424 pivotally mounted on an overhead carriage 426 and biased counterclockwise by a counterweighted biasing mechanism 432 toward a normal position engaging a stop 431 on the carriage. The biasing mechanism also urges the carriage along an overhead monorail 434 extending obliquely across the path of the car 423 to a normal position engaging stop 433 on the monorail. The carriage is somewhat elongated and has no tendency to turn on the monorail but slides easily therealong. The arm 424 is mounted pivotally on the carriage by a vertical pin and bearing structure 427.

Figure 9:
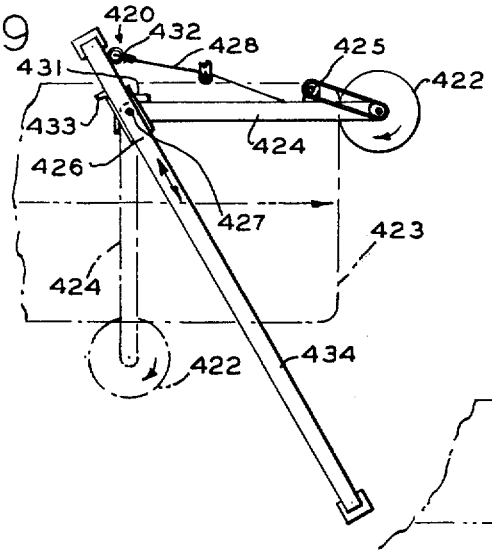

In the operation of the wraparound brush device 420, with the car 423 being advanced along its path toward the right, as viewed in FIG. 9, and the arm 424 and the carriage 426 in their normal positions, the car engages and pushes the brush 422 forwardly. This pulls the carriage along the monorail forwardly and across the path to move the brush across the path until the brush clears the right front corner of the car, the brush brushing the front end of the car and driving itself to the right from reaction to the brushing movement. Then the brush brushes the side of the car and drives itself rearwardly along the side of the car to swing the arm 424 clockwise to the broken line position thereof and return the carriage 426 to its normal position. The arm 424 then extends primarily across the path of the car. Then, after the right rear corner clears the brush, the biasing mechanism 432 swings the arm 424 counterclockwise to move the brush forwardly with and across the rear end of the car to keep the brush in contact with the rear end of the car until the arm 424 reaches its normal position.

EMBODIMENT OF FIG. 10

Figure 10:
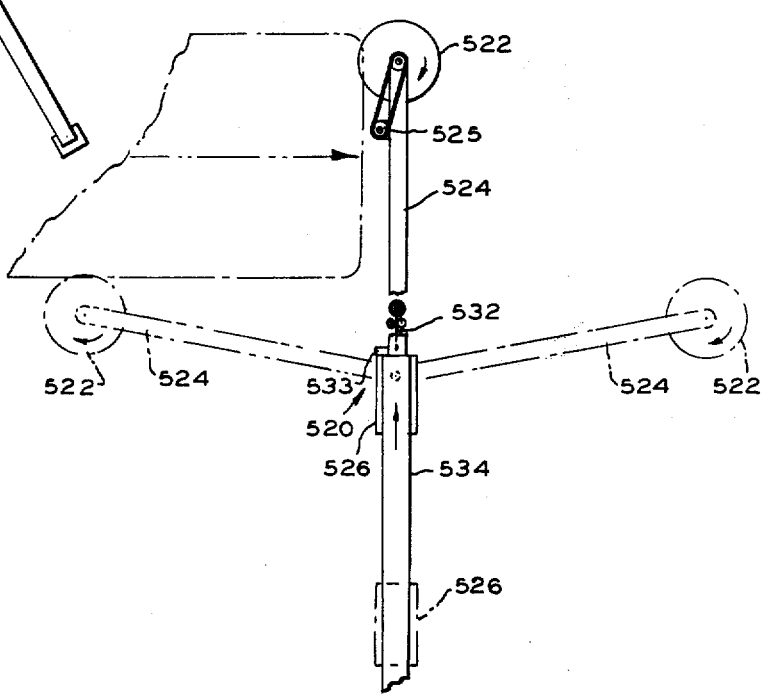

An improved wraparound brush device 520 forming an alternate embodiment of the invention includes a brush 522 rotated clockwise by a motor 525 to brush the front end, the right side and the rear end of a car 423 advanced to the right, as viewed in FIG. 10. The brush 522 is carried by an overhead arm 524 pulled toward a normal position extending transversely over the path of the car by a counterweighted biasing mechanism 532, which pulls, through the arm 524, a carriage 526 toward a normal position engaging a stop 533 on a monorail supporting the carriage and extending transversely outwardly from the path of the car.

In its operation, with the wraparound brush device 520 in its normal position, the car 423 engages the brush 522 and pushes it to swing the arm 524 clockwise to its front clearing position shown in broken lines, the brush brushing the front end of the car. Then the brush drives itself rearwardly along the right side of the car and pushes the carriage outwardly along the monorail 534 and goes over center and moves the arm to a rearwardly extending position shown in dotted lines with the carriage 526 returning to its starting position. Then, as the right rear corner of the car moves past the brush, the arm 524 is swung clockwise to keep the brush in engagement with the rear end of the car and move the brush across the rear end of the car.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a wraparound brush device:

a rotary brush, an overhead guide track extending transversely relative to a path of a car, a carriage movable along the track between a normal position and a second position, an arm carrying the brush at one end thereof and pivotally mounted on the carriage at the other end thereof for movement by the car with the carriage from a normal position in which said brush, when the carriage is in the normal position thereof, is positioned in said path, and a second position in which the brush is at a side of said path, biasing means continuously urging the carriage and the arm toward the normal positions thereof and permitting movement of the carriage and the arm to the second positions thereof, and means for rotating the brush in a direction in which the brush first tends to move itself across the front of the car, then moves itself rearwardly along the side of the car and then moves itself across the rear of the car, the rotation of the brush on the side of the car serving to swing the arm against the action of the biasing means rearwardly relative to the direction of movement of the car to a cocked position from which the biasing means swings the arm forwardly after the brush clears the side of the ca to maintain the brush in engagement with the rear of the car as the car is moved in said direction and the arm is moved back to the normal position thereof.

2. The wraparound brush of claim 1 wherein the arm when in its normal position extends forwardly along said path and the track extends horizontally and at an acute angle relative to said path, the carriage being moved along the track forwardly and across the path while the brush is in engagement with the front of the car and being moved back toward the normal position of the carriage while the brush is in engagement with the side of the car.

3. The wraparound brush device of claim 1 wherein the arm when in the normal position thereof extends primarily across said path, swings to a forwardly extending position while the brush is in engagement with the front of the car, swings to a rearwardly extending position while the brush is in engagement with the side of the car and swings to the normal position thereof while the brush in in engagement with the rear of the car, the track extending primarily transversely of said path, the carriage when in its normal position being at one side of said path and being moved away from said path and then back to the normal position thereof as the arm is swung from the forwardly extending position thereof to the rearwardly extending position thereof.

4. In a wraparound brush device, rotary brush means, brush-suspending means including overhead guide track means and carrier means movable along the guide track means and suspending the brush means, means mounting the brush-suspending means above a predetermined path of a car for sequential movement of the brush means across the front end of the car to one side of the car and forwardly and across the rear end of the car as the car is advanced along said path, means for rotating the brush in a direction such that reaction of the brush from contact with the car tends to move the brush in said sequential movement, and positioning means urging the carrier means toward a normal position at one end of the track means while the brush means is in engagement with the front end of the car, the positioning means permitting movement of the carrier means along the track means from the normal position to a second position and back during the engagement of the brush means with the side of the car, and holding the carrier means at the normal position thereof while the brush means is in engagement with the rear end of the car.

5. In a wraparound brush device, rotary brush means, brush-suspending means including overhead guide track means and overhead carrier means including a carriage slidable on the guide track means between a normal position at one end of the guide track means and a second position spaced from said one end of the guide track means, he carriage suspending the rotary brush means, neans biasing the carriage toward the normal position thereof and permitting movement of the carriage to the second position thereof, means mounting the brush-suspending means at a height above the top of a car advanced forwardly along a predetermined path and mounting a portion of the brush-suspending means for pivotal movement forwardly from a first position and rearwardly from the first position, the portion of the brush-suspending means mounted for pivotal movement being adapted to be swung forwardly to a forward position from the first position thereof by engagement and movement of the rotary brush means by the front end of the car to move the brush to one side of the car, being adapted to be swung from the forward position thereof rearwardly past the first position thereof to a rear position while the brush means is in engagement with the one side of the car, and being adapted to be swung from the rear position thereof forwardly toward the first position thereof to keep the brush in engagement with and move the brush across the rear end of the car, means rotating the rotary brush means in a predetermined direction to tend to move the brush means across the front end of the car to said one side thereof while the brush means engages the front end of the car, rearwardly along the car while the brush is in engagement with the one side of the car and across the rear end of the car from said one side of the car while the brush engages the rear end of the car, and means urging the portion of the brush-suspending means mounted for pivotal movement toward the first position thereof, the carriage tending to be at or near the normal position thereof while the rotary brush means is in engagement with the front end of the car and being movable from the normal position thereof to the second position thereof by the reaction of the rotary brush means on the one side of the car to move the portion of the brush-suspending means mounted pivotably from the forward position thereof through the first position thereof to the rear position thereof.

6. In a wraparound brush device, a rotary brush, brush-suspending means including overhead guide track means and and carrier means movable along the guide track means and suspending the brush means, means mounting the brush suspending means pivotally relative to a predetermined path of a car for sequential movement of the brush forward and across the front end of the car to one side of the car, back along said one side of the car and forwardly and across the rear end of the car as the car is advanced along said path, and means for rotating the brush in a direction such that reaction of the brush from contact with the car tends to move the brush in said sequential movement, the brush suspending means being so constructed and arranged that the carrier means is movable forwardly while the brush is in engagement with the front end of the car, rearwardly while the brush is in engagement with the one side of the car and forwardly while the brush is in engagement with the rear end of the car.

7. In a wraparound brush device, a rotary brush, overhead brush-suspending means suspending the brush normally in a normal position in the path of a car advancing therealong and moving the brush across the front end of the car to one side of the car as the car pushes the brush forwardly along the path, permitting movement of the brush rearwardly along said one side of the car rearward of the normal position thereof and moving the brush forwardly with the car and across the rear end of the car to the normal position of the brush, the brush-suspending means including a guide track portion and a carrier portion carrying the brush, means mounting one of the portions for pivotal movement forwardly from a first position to a forward position while the brush is engaged by the front end of the car; for pivotal movement rearwardly from the forward position past the first position to a rear position while the brush is in engagement with the one side of the car and for pivotal movement forwardly from the rear position to the first position while the brush is in engagement with the rear end of the car, the carrier portion including a carriage slidable along the guide track portion between a normal position near one end of the guide track portion and a second position more remote from said one end of the guide track portion to permit said one of the portions to be pivotal from the forward position thereof to the first position thereof, the carriage being movable from the second position thereof to the normal position thereof to keep the brush in engagement with the one side of the car while said one of the portions is moved from the first position thereof to the rear position thereof, means urging said one of the portions toward the first position thereof and the carriage toward the normal position thereof, and means for rotating the brush in a direction such that reaction of the brush from engagement with the one side of the car tends to move said one of the portions from the forward position thereof to the rear position thereof while the brush is in engagement with the one side of the car.

*8. The wraparound brush device of claim 6 wherein the brush suspending means includes an arm movable forwardly to a forward position from a normal position while the brush is in engagement with the front end of the car and movable back to the normal position thereof during the period in which the brush engages the side and rear end of the car, and biasing means for so moving the arm.*

*9. The wraparound brush of claim 8 wherein the arm is movable rearwardly from its forward position while the brush is in engagement with the side of the car.*

*10. The wraparound brush of claim 9 wherein the arm is movable rearwardly from its forward position past its normal position to a rearward position while the brush is in engagement with the side of the car and is movable from its rearward position to its normal position while the brush is in engagement with the rear end of the car.*

*11. The wraparound brush of claim 6 wherein the guide track means is fixed and the carrier means includes a carriage movable along the guide track means and an arm carrying the brush and pivotal on the carriage.*

* * * * *